US 12,005,773 B2

(12) United States Patent
Mathie et al.

(10) Patent No.: US 12,005,773 B2
(45) Date of Patent: Jun. 11, 2024

(54) VEHICLE TANK MOUNTING ASSEMBLY

(71) Applicant: FORD GLOBAL TECHNOLOGIES, LLC, Dearborn, MI (US)

(72) Inventors: Craig Michael Mathie, White Lake Township, MI (US); Michael Jon Veenstra, Southgate, MI (US); Joseph Michael Conrad, II, Temperance, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 214 days.

(21) Appl. No.: 17/386,941

(22) Filed: Jul. 28, 2021

(65) Prior Publication Data

US 2023/0035124 A1   Feb. 2, 2023

(51) Int. Cl.
  *B60K 15/07*   (2006.01)
  *B60K 15/03*   (2006.01)
  *B62D 21/02*   (2006.01)

(52) U.S. Cl.
  CPC ........ *B60K 15/03006* (2013.01); *B62D 21/02* (2013.01); *B60K 2015/03118* (2013.01)

(58) Field of Classification Search
  CPC .............. B60K 15/03; B60K 15/067; B60K 2015/0675; B60K 15/07; B60K 15/03006; B62D 21/12; B62D 27/023; B62D 29/00; B62D 21/15; B60D 1/483; B60D 1/50; B60D 1/52
  See application file for complete search history.

(56) References Cited

U.S. PATENT DOCUMENTS

| 5,794,979 A | * | 8/1998 | Kasuga ................. | B60K 15/07 180/69.5 |
| 5,810,309 A | * | 9/1998 | Augustine ............. | B60K 15/07 248/154 |
| 6,029,989 A | * | 2/2000 | Stuart ..................... | B60R 3/00 182/150 |
| 6,076,844 A | * | 6/2000 | Stuart ..................... | B60R 3/00 182/150 |

(Continued)

FOREIGN PATENT DOCUMENTS

| CN | 101480918 A | * | 7/2009 |
| DE | 102012000402 B3 | * | 4/2013 |

(Continued)

OTHER PUBLICATIONS

DE 102017004756 A1 English Translation (Year: 2018).*
JP 2017185843 English Translation (Year: 2017).*

*Primary Examiner* — George C Jin
*Assistant Examiner* — Teuta B Holbrook
(74) *Attorney, Agent, or Firm* — Brooks Kushman P.C.; David Kelley (57) ABSTRACT

A mounting assembly for a vehicle is provided. The vehicle has a chassis with a first frame rail and a second frame rail extending longitudinally. The mounting assembly has a bracket with a concave region to receive and attach to a compressed gas tank to move the compressed gas tank away from an external force applied to an outer surface of the tank and in a first direction towards and beneath the first frame rail. The bracket has a first end region connected to the first frame rail to position the tank on an outboard side of the first frame rail.

20 Claims, 5 Drawing Sheets

(56) References Cited

U.S. PATENT DOCUMENTS

| | | | | |
|---|---|---|---|---|
| 6,099,007 | A * | 8/2000 | Stuart | B60R 3/00 |
| | | | | 182/150 |
| 6,152,470 | A * | 11/2000 | Stuart | B60R 3/00 |
| | | | | 182/150 |
| 7,984,925 | B2 * | 7/2011 | Levin | B60K 15/067 |
| | | | | 280/833 |
| D868,665 | S * | 12/2019 | Rike | D8/396 |
| 10,696,154 | B2 * | 6/2020 | Arold | F17C 13/083 |
| 2009/0133948 | A1 | 5/2009 | Ijaz et al. | |
| 2009/0309349 | A1 | 12/2009 | Yamanami et al. | |
| 2010/0066128 | A1 * | 3/2010 | Hendriks | B62D 21/12 |
| | | | | 296/204 |
| 2011/0174856 | A1 * | 7/2011 | Hayashi | B60K 15/07 |
| | | | | 224/538 |
| 2011/0180551 | A1 * | 7/2011 | Handa | B60K 15/03006 |
| | | | | 220/592.2 |
| 2016/0023548 | A1 * | 1/2016 | Crist | B65F 3/00 |
| | | | | 180/271 |
| 2016/0096495 | A1 * | 4/2016 | Sasaki | B60R 16/08 |
| | | | | 248/505 |
| 2017/0240045 | A1 | 8/2017 | Ohashi | |
| 2017/0282709 | A1 * | 10/2017 | Sasaki | B60K 15/03006 |
| 2017/0334288 | A1 * | 11/2017 | Rike | B60K 15/07 |
| 2019/0039446 | A1 | 2/2019 | Koike et al. | |
| 2020/0247234 | A1 * | 8/2020 | Sawada | B62D 21/152 |

FOREIGN PATENT DOCUMENTS

| | | | |
|---|---|---|---|
| DE | 102017004756 A1 | * | 11/2018 |
| GB | 2522543 A | * | 7/2015 |
| JP | 2017185843 A | * | 10/2017 |
| KR | 200158529 Y1 | * | 10/1999 |
| WO | WO-2013058699 A1 | * | 4/2013 |

* cited by examiner

VEHICLE TANK MOUNTING ASSEMBLY

TECHNICAL FIELD

Various embodiments are directed to a mounting assembly for a vehicle fuel tank.

BACKGROUND

Vehicles may include one or more fuel tanks, such as compressed gas fuel tanks, to provide fuel for an engine, fuel cell, or other system to propel the vehicle. The fuel tanks may be connected to the vehicle chassis.

SUMMARY

In an embodiment, a vehicle is provided with a chassis having a first frame rail and a second frame rail, with each frame rail extending longitudinally. A mounting assembly has a bracket with a concave region to receive and attach to a compressed gas tank to move the compressed gas tank away from an external force applied to an outer surface of the tank and in a first direction towards and beneath the first frame rail. The bracket has a first end region connected to the first frame rail to position the tank on an outboard side of the first frame rail.

In another embodiment, a mounting assembly for a compressed gas fuel tank is provided. An outer frame supports the compressed gas fuel tank, with the outer frame defining a recessed area to receive at least a portion of the compressed gas fuel tank therein. A hinge is connected to the outer frame to rotatably connect the outer frame to a longitudinal frame rail of a vehicle chassis and support the compressed gas fuel tank on an outboard side thereof such that the recessed area is positioned between the outer frame and the frame rail. A locking element is connected to the outer frame, with the locking element maintaining a position of the outer frame relative to the hinge in a first state, and releasing the hinge in a second state such that the outer frame and tank rotate away from an external force applied to an outer surface of the tank and in a first direction towards and beneath the frame rail.

In an embodiment, a mounting assembly for a compressed gas fuel tank is provided with a bracket extending from a first end region to a second end region. The first end region connects to a longitudinal frame rail of a vehicle chassis to support the compressed gas fuel tank on an outboard side thereof. The bracket defines a concave region positioned between the first and second end regions. The concave region sized to receive the compressed gas fuel tank and extend about at least a portion of an outer perimeter of the tank. The mounting assembly plastically deforms without fracture to move the compressed gas fuel tank away from an external force applied to an outer surface of the tank and in a first direction towards and beneath the frame rail.

DETAILED DESCRIPTION

As required, detailed embodiments of the present disclosure are provided herein; however, it is to be understood that the disclosed embodiments are merely examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
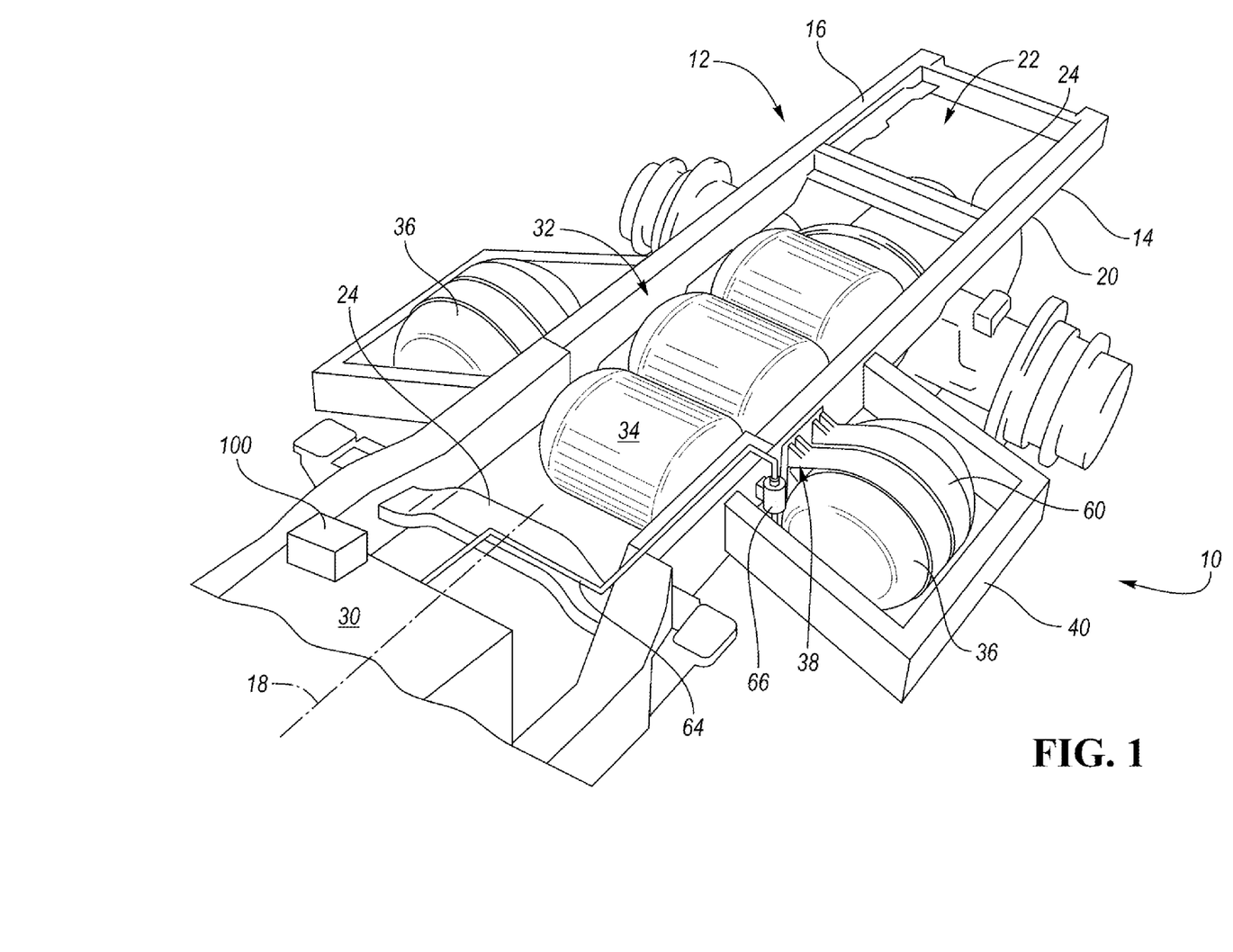
FIG. 1 is a partial perspective view of a vehicle according to an embodiment.

FIG. 1 illustrates partial perspective view of a vehicle 10 with a chassis 12. The vehicle may be a passenger vehicle, or may be a light, medium, or heavy duty commercial vehicle. The chassis 12 has a first longitudinal frame rail 14 and a second longitudinal frame rail 16. The first and second frame rails 14, 16 extend along a longitudinal direction 18 for the vehicle 10 and chassis 12. Each of the frame rails 14, 16 have an outboard face 20 and an opposite inboard face. An interior region 22 for the chassis is defined between the two frame rails 14, 16. The frame rails 14, 16 are connected to one another via transverse rails 24 of the chassis.

The vehicle 10 has a prime mover 30 that is connected to the vehicle wheels to propel the vehicle. The prime mover 30 may be an engine, a fuel cell connected to a traction battery and an electric motor, or the like. The prime mover 30 is in fluid communication with a fuel system 32. As used herein, fluid includes both gas and vapor phase substances, as well as liquid phase. The fuel system 32 may be provided by a compressed gas as the fuel, such as hydrogen, compressed natural gas, or another gas-phase fuel. The gas phase fuel is stored in compressed fuel tanks onboard the vehicle.

The fuel system 32 for the vehicle may include one or more compressed gas tanks 34 that are positioned in the interior region 22 between the two frame rails 14, 16. In order to increase the driving range of the vehicle 10, it may be desirable to include additional compressed gas tanks for the fuel system 32. As shown in FIG. 1, additional compressed gas fuel tanks 36 may be provided outboard of the first and second frame rails.

In the example shown in FIG. 1, the fuel system 32 has first and second compressed gas tanks 36 that are positioned outboard of the first and second longitudinal fuel rails 14, 16, or are externally mounted on the outside of the vehicle chassis 12 or frame rails. The vehicle 10 may be provided with more than two outboard fuel tanks, or with only one outboard fuel tank. As the outboard fuel tanks 36 are provided for use with compressed gas, the outboard fuel tanks are designed as pressure vessels. In one example, and as shown, the outboard fuel tanks 36 each have a circular outer perimeter, or circular cross-section.

An outboard fuel tank 36 is connected to the associated frame rail 14, 16 via a mounting assembly 38, as described in greater detail below with reference to FIGS. 2-7. The mounting assembly 38 is shown generically in FIG. 1. The mounting assembly 38 structurally supports the outboard fuel tank 36 relative to the frame rail 14, 16 during normal vehicle operation. Further, in the event of a load or external force applied to the outboard fuel tank 36, for example a vehicle side impact, the mounting assembly 38 may absorb or dissipate energy from the external force or impact, as well as allow the outboard fuel tank 36 to move relative to the chassis 12 and away from the external force to deflect the external force or load and maintain structural integrity of the outboard fuel tank 36, rather than rigidly connecting the outboard fuel tank to the chassis. The mounting assembly 38 may be further provided to maintain the connection between the fuel tank 36 and the chassis 12 in the event of an external force or impact, e.g. by acting as a tether for the external fuel tank to the chassis. According to various embodiments described below, the mounting assembly 38 moves the compressed gas tank 36 away from an external force F applied to an outer surface of the tank 36 and in a first direction towards and/or beneath the associated frame rail 14, 16.

As described below, a secondary rail 40 may be connected to each frame rail 14, 16 and surround the associated outboard fuel tank 36 as shown in FIG. 1. The secondary rail 40 has a first end and a second end, with the first and second ends each connected to the associated frame rail 14, 16. The secondary rail 40 extends transversely outwardly from the associated frame rail 14, 16 on the outboard side thereof and surrounds the compressed gas tank 36.

In other examples as described below, the vehicle 10 and outboard fuel tank 36 may be provided without a secondary rail 40 or other outboard surrounding frame structure to reduce vehicle weight and increase vehicle driving range.

By positioning tanks 36 outboard of the chassis 12 and frame rails 14, 16, the vehicle range may be increased. This may be useful in vehicle applications requiring long range or low density fuels, such as a vehicle 10 powered by a hydrogen engine or hydrogen fuel cell. By providing a mounting assembly 38 as described below, and permitting the outboard tanks 36 to move away from an external load F, the use of alternative materials to form the tanks may be available, e.g. a carbon fiber or other composite tank.

Figure 2A:
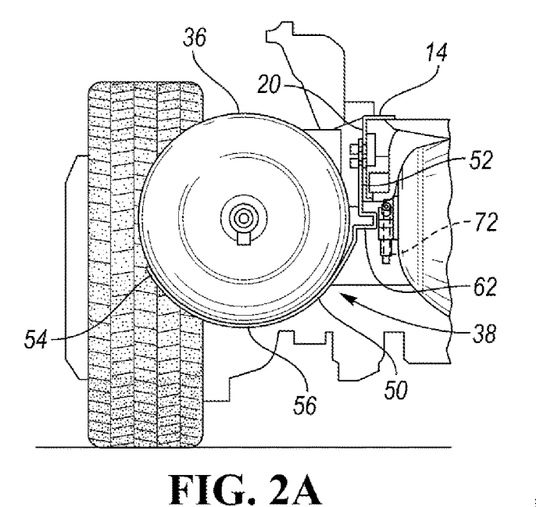
FIGS. 2A, 2B, and 2C illustrate side schematic views of a mounting assembly in various positions according to an embodiment and for use with the vehicle of FIG. 1.
Figure 2B:
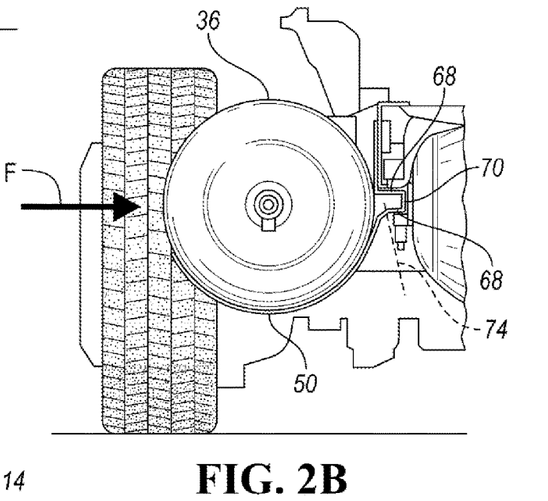
Figure 2C:
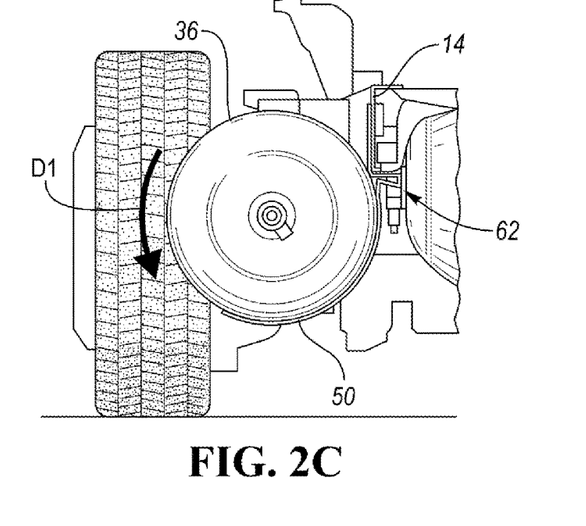

FIG. 2A illustrates a mounting assembly 38 for a compressed gas fuel tank according to an embodiment, and in a normal use position. FIG. 2B illustrates the mounting assembly 38 of FIG. 2A with an external load or force applied to the tank. FIG. 2C illustrates the mounting assembly 38 of FIG. 2A after a deformation of the mounting assembly. The mounting assembly 38 may be used with the vehicle 10 of FIG. 1, and further may be used without a secondary rail 40 or other frame surrounding the tank and positioned outboard of the tank, as shown in FIGS. 2A-C.

The mounting assembly 38 has at least one bracket 50. According to the example shown, the bracket 50 may be provided by a J-shaped bracket. The mounting assembly 38 may include a plurality of brackets, or only a single bracket. The bracket 50 extends from a first end region 52 to a second end region 54. The bracket 50 further defines a concave region 56 positioned between the first and second end regions 52, 54. The concave region 56 may be positioned adjacent to the second end region 54 or form the second end region 54 as shown.

The mounting assembly 38 and bracket 50 move the compressed gas tank 36 from first position as shown in FIG. 2A, away from an external force F applied to an outer surface of the tank 36 as shown in FIG. 2B, and in a first direction D1 towards and beneath the first frame rail 14 as shown in FIG. 2C.

The concave region 56 of the bracket 50 is sized and shaped to receive and attach to the tank 36. The concave region 56 may surround and extend about at least a portion of an outer perimeter of the fuel tank 36. As shown, the fuel tank 36 may have a circular outer perimeter, or a circular cross-sectional shape. The tank 36 may be connected to the bracket 50 via one or more mounting straps 60, band clamps, or the like as shown in FIG. 1. The strap 60 extends about the compressed gas tank 36 and the bracket 50 to maintain the compressed gas tank 36 within the concave region 56 of the bracket 50.

The first end region 52 of the bracket 50 may be formed to mount and connect to the first frame rail 14 to position the tank 36 on an outboard side of the first frame rail. The first end region 52 of the bracket 50 may be mounted to an outboard face 20 of the first frame rail as shown. In one example, the bracket 50 may be mounted to the first frame rail 14 via fasteners, such as bolts. In another example, the bracket 50 may be mounted to the first frame rail 14 via welding or another process.

The bracket 50 defines a stress riser 62 positioned between the concave region 56 and the first end region 52 to plastically deform in response to the external force on the tank 36. The stress riser 62 allows for localized plastic deformation at the location of the stress riser, while still allowing the bracket 50 to carry load. In various examples, the stress riser 62 plastically deforms without fracturing in response to the external force on the tank 36. By not fracturing, the bracket 50 maintains the connection of the tank 36 to the frame rail 14 after the external load or force F has been applied. Furthermore, additional tethers may be provided in the event that the bracket 50 does fracture, with the tethers directly connecting the tank 36 to the frame rail 14 or another point on the chassis 12.

The bracket 50 is formed from a material such as a metal which is ductile enough to initiate plastic deformation at an external force F that is lower than a force needed to deform the tank 36. The stress riser 62 in the bracket 50 provides for force absorption by creating a geometry which facilitates ductile deformation in a controlled location, and under controlled conditions. The stress riser 62 allows the tank 36 to move away from the external force F being applied to the tank 36, as well as control the tank's path of travel.

A fuel line 64 is provided and fluidly connects the compressed gas tank 36 to a prime mover 30 of the vehicle via a valve assembly 66. In one example, the valve assembly 66 is a normally closed solenoid valve, where the valve plunger defaults to a closed position unless it is powered and controlled to an open position.

The stress riser 62 may be formed as a corrugated shape by the bracket 50 as shown, or by another bend, fold, or partial loop in the bracket 50 that localizes the plastic deformation. In the example shown, the bracket 50 has a single corrugation with two side walls 68 that are angled relative to the adjacent bracket 50 wall and an end wall 70 connecting the side walls 68. In other examples, multiple corrugations may be provided. In a further example, one or more slots, apertures, or notches may additionally or alternatively be provided as a stress riser 62 in the bracket 50. Furthermore, dissimilar material or metals could be fused together in a way, e.g. with a band of a ductile material or metal connecting the first end region 52 of the bracket 50 to the concave region 56, with both the first end region 52 and concave region 56 being less ductile that the band, such that the band of metal acts as a stress riser 62 and will deform before the other components of the bracket 50 when the external force F is applied.

In some examples, the mounting assembly 38 may further include a stop limit 72 shown in broken lines. The stop limit 72 is connected to the chassis 12, e.g. to the first frame rail 14. The stop limit 72 is positioned to limit movement of the tank 36 in the first direction D1. In the example shown, the stop limit 72 may contact the bracket 50 and/or the tank 36 to limit movement of the tank in the first direction D1. The stop limit 72 may be formed from a metal, or from a resilient material such as a rubber or plastic.

In further examples, the mounting assembly 38 may include a dive plate 74 shown in broken lines. The dive plate 74 is connected to the chassis 12, e.g. to the first frame rail 14, and may be longitudinally offset from the bracket 50. The dive plate 74 is positioned to guide movement of the tank 36 in the first direction D1. In the example shown, the dive plate 74 may contact the bracket 50 and/or the tank 36 to guide movement of the tank in the first direction D1 and along an outer face of the dive plate 74. The outer face of the dive plate 74 may be planar or another complex shape. The outer face of the dive plate 74 may be parallel to the first direction D1 such that the bracket 50 and/or tank 36 slide or translate along the outer face of the dive plate 74.

Figure 3A:
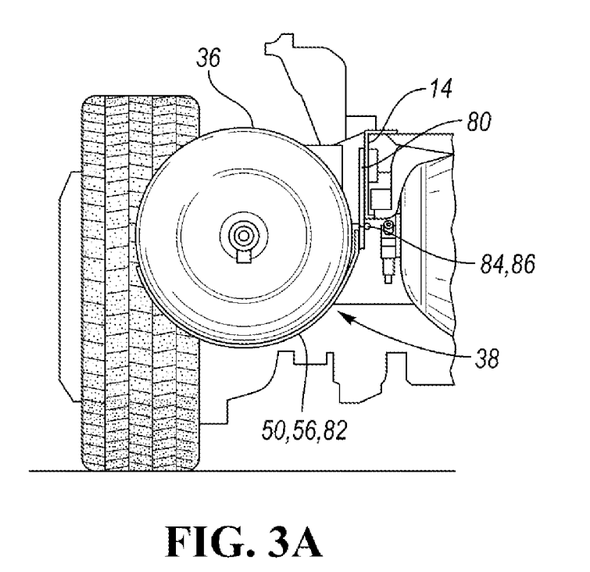
FIGS. 3A and 3B illustrate side schematic views of a mounting assembly in two positions according to another embodiment and for use with the vehicle of FIG. 1.
Figure 3B:
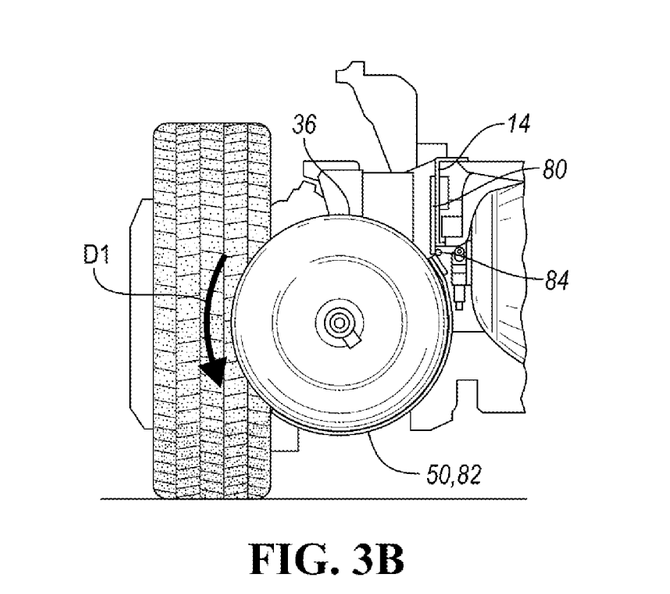

FIG. 3A illustrates a mounting assembly 38 for a compressed gas fuel tank 36 according to another embodiment, and in a normal use position. FIG. 3B illustrates the mounting assembly 38 of FIG. 3A with an external load or force applied to the tank 36 and after movement of the mounting assembly 38. The mounting assembly 38 may be used with the vehicle of FIG. 1, and further may be used without a secondary rail 40 or other frame surrounding the tank 36 and positioned outboard of the tank 36, as shown in FIGS. 3A-B. Elements in FIGS. 3A-B that are the same as or similar to those described above with respect to FIG. 2 are given the same reference number and reference may be made to the detailed description above.

The mounting assembly 38 has at least one bracket 50. According to the example shown, the bracket 50 may be provided by a J-shaped bracket. The mounting assembly 38 may include a plurality of brackets, or only a single bracket. The bracket 50 extends from a first end region 52 to a second end region 54, and defines a concave region 56 positioned between the first and second end regions 52, 54. The tank 36 may be connected to the bracket 50 via one or more mounting straps. The mounting assembly 38 and bracket 50 move the compressed gas tank 36 from first position as shown in FIG. 3A, away from an external force applied to an outer surface of the tank 36 and in a first direction D1 towards and beneath the first frame rail 14 as shown in FIG. 3B. The mounting assembly 38 may additionally be provided with a stop limit 72 or dive plate 74 as described above.

The bracket 50 may be provided as a two-part bracket, with the bracket 50 split between the first end region 52 and the concave region 56. The first portion 80 of the bracket defines the first end region 52 of the bracket. The second portion 82 of the bracket defines the concave region 56 and second end region 54 of the bracket. The mounting assembly 38 has a hinge 84 that rotatably couples the two portions 80, 82 of the bracket 50 to one another, and allows the second portion 82 to rotate relative to the first portion 80 and the chassis 12.

The hinge 84 is provided as a locked hinge assembly with a locking element 86. The locking element 86 prevents the hinge 84 from moving, and therefore prevents rotational or other movement of the second portion 82 of the bracket relative to the first portion 80. The locking element 86 may be connected to the hinge 84 itself, e.g. as a shear pin. In other examples, the locking element 86 may be provided as welded plate or other part of the bracket 50 that rigidly connects the first and second portions 80, 82 of the bracket, or connects two parts of the hinge 84 to one another. In a further example, the locking element 86 may be provided as a fastener, such as a rivet or bolt, that interconnect the two portions 80, 82 of the bracket, and lock the hinge 84. In response to the external force being applied to the tank 36, the locking element 86 fractures to release the hinge such that the second portion of the bracket and the tank 36 rotate relative to the first frame rail and in the first direction D1 as shown in FIG. 3B. The locking element 86 therefore shears or fractures at a given force load or threshold value that is associated with the external force on the tank 36.

Figure 4:
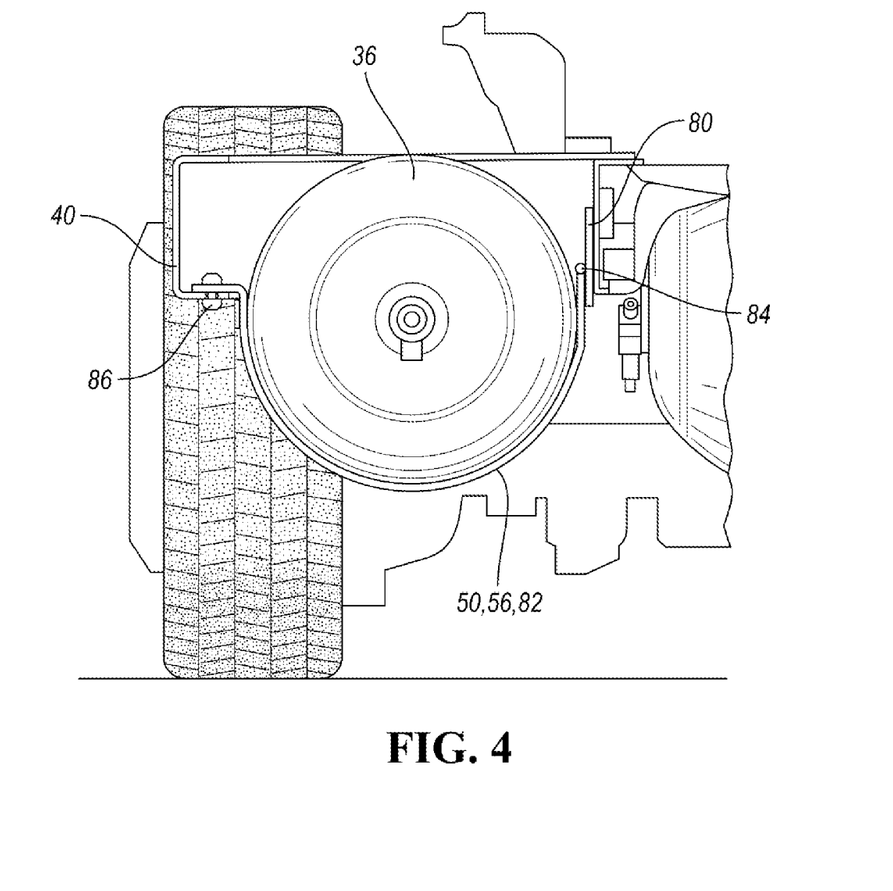
FIG. 4 illustrates a side schematic view of a mounting assembly in according to an embodiment and for use with the vehicle of FIG. 1.

FIG. 4 illustrates a mounting assembly 38 for a compressed gas fuel tank 36 according to yet another embodiment, and in a first, use position. The mounting assembly 38 of FIG. 4 is intended for use with a secondary rail 40 or other frame surrounding the tank 36 and positioned outboard of the tank 36 as shown in the Figure. Elements in FIG. 4 that are the same as or similar to those described above with respect to FIGS. 2-3 are given the same reference number and reference may be made to the detailed description above.

The mounting assembly 38 has at least one bracket 50. According to the example shown, the bracket 50 may be provided by a J-shaped bracket. The mounting assembly 38 may include a plurality of brackets, or only a single bracket. The bracket 50 extends from a first end region 52 to a second end region 54, and defines a concave region 56 positioned between the first and second end regions. The tank 36 may be connected to the bracket 50 via one or more mounting straps. The mounting assembly 38 and bracket 50 move the compressed gas tank 36 from first position as shown in FIG. 4 towards a second position, away from an external force applied to an outer surface of the tank 36 and/or the secondary rail 40 and in a first direction D1 towards and beneath the first frame rail, similar to that shown and described above with respect to FIGS. 2-3. The mounting assembly 38 may additionally be provided with a stop limit 72 or dive plate 74 as described above.

The bracket 50 may be provided with a first portion 80 and a second portion 82, with the portions of the bracket split between the first end region 52 and the concave region 56. The mounting assembly 38 has a hinge 84 that rotatably couples the two portions 80, 82 of the bracket to one another, and allows the second portion 82 to rotate relative to the first portion 80 and the chassis 12.

The mounting assembly 38 has a locking element 86 that connects the second end region 54 of the bracket to the secondary rail 40. The locking element 86 prevents the hinge 84 from moving, and therefore prevents rotational or other movement of the second portion 82 of the bracket relative to the first portion 80.

The locking element 86 may be provided as welded plate that rigidly connects the second end region 54 of the bracket to the secondary rail 40. In other examples and as shown, the locking element 86 may be provided as a shear pin or as a fastener, such as a rivet or bolt, that interconnect the second end region 54 of the bracket and the secondary rail 40 to one another. The locking element 86, such as a shear pin or rivet, shears or fractures at a given force load or threshold value that is associated with the external force on the tank 36 and/or secondary rail 40.

In response to the external force being applied to the tank 36, the locking element 86 fractures to release the hinge 84 such that the second portion 82 of the bracket and the tank 36 rotate relative to the first frame rail 14 and in the first direction D1.

The first end region 52 of the bracket is therefore connected to the first frame rail 14 via a hinge 84, such as a freely rotating or unlocked hinge. The second end region 54 of the bracket is connected to the secondary rail 40 via a locking element 86. The locking element 86 fractures in response to the external force on the tank 36 and/or the secondary rail 40 such that the bracket 50 rotates relative to the first frame rail 14 via the hinge 84. The locking element 86 is therefore spaced apart and separate from the hinge 84.

Figures 5, 6, 7:
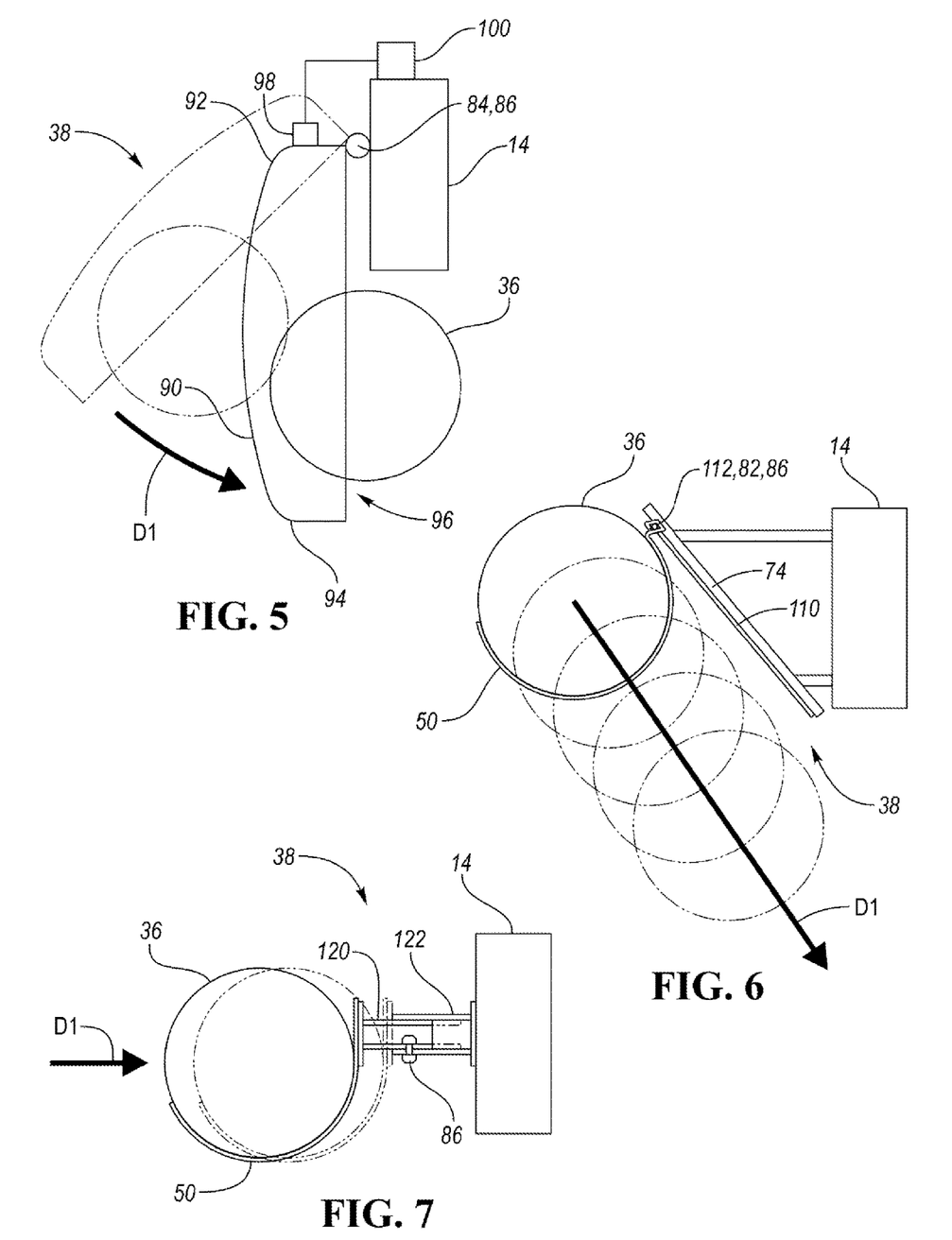
FIG. 5 illustrates a side schematic view of a mounting assembly in two positions according to another embodiment and for use with the vehicle of FIG. 1.
FIG. 6 illustrates a side schematic view of a mounting assembly in two positions according to an embodiment and for use with the vehicle of FIG. 1.
FIG. 7 illustrates a side schematic view of a mounting assembly according to another embodiment and for use with the vehicle of FIG. 1.

FIG. 5 illustrates a mounting assembly 38 for a compressed gas fuel tank 36 according to another embodiment, with a first, use position shown in broken lines, and a second position after an external force has been applied to the tank 36 in solid lines. The mounting assembly 38 of FIG. 5 is intended for use without a secondary rail 40 or other frame surrounding the tank 36 and positioned outboard of the tank 36. Elements in FIG. 5 that are the same as or similar to those described above with respect to FIGS. 2-4 are given the same reference number and reference may be made to the detailed description above.

The mounting assembly 38 has an outer frame 90. The outer frame 90 may form the bracket 50 of the mounting assembly 38 such that the tank 36 is directly mounted to the outer frame 90. Alternatively, a bracket 50 may be connected to the outer frame 90 with the bracket 50 supporting the tank 36. The outer frame 90 or the bracket 50 defines a concave region 56 sized to receive the tank 36.

The outer frame 90 extends from a first end region 92 to a second end region 94. The outer frame 90 may be sized to extend the length and the width of the tank 36, such that the outer frame forms a recessed area 96 that is sized to receive at least a portion of the tank 36. The concave region 56 may be positioned within the recessed area 96 of the outer frame.

The mounting assembly 38 and outer frame 90 move the compressed gas tank 36 from a first position as shown in broken lines towards a second position as shown in solid lines, away from an external force F applied to an outer surface of the tank 36 and/or an outer surface of the outer frame 90 and in a first direction D1 towards and beneath the first frame rail 14, similar to that shown and described above with respect to FIGS. 2-4. The mounting assembly 38 may additionally be provided with a stop limit 72 or dive plate 74 as described above.

The first end region 92 of the outer frame 90 is rotatably connected to the first frame rail 14 via a hinge 84 and a locking element 86 such that the recessed area and the tank 36 are positioned between the outer frame 40 and the first frame rail 14. The hinge 84 may be provided as a locked hinge assembly with a locking element 86 as described above with respect to FIG. 3. In response to the external force being applied to the tank 36 and/or the outer frame 90, the locking element 86 fractures to release the hinge 84 such that the outer frame 90 and the tank 36 rotate relative to the first frame rail 14 and in the first direction D1 as shown in the Figure. The locking element 86 therefore shears or fractures at a given force load or threshold value that is associated with the external force on the tank 36 and/or the outer frame 90.

In a further example, the locking element 86 is electronically controlled, e.g. as a locking arm or other member that engages the hinge 84 or the outer frame 90 to maintain the hinge 84 in the first position, and a sensor 98 is connected to the tank 36 or to the mounting assembly 38. The locking arm position of the locking element 86 may be controlled via an electric motor, solenoid, or the like. The sensor 98 may be provided as an accelerometer, or another impact or force sensor. The sensor 98 is configured to detect or sense an external force or load on the mounting assembly 38, tank 36, or outer frame 90. The sensor 98 may be a part of an advanced driver assistance system (ADAS). The locking element 86 maintains a position of the outer frame 90 relative to the frame rail 14 in a first state, and releases the hinge 84 in a second state such that the outer frame 90 and tank 36 rotate away from an external force F applied to an outer surface of the tank 36 and/or the outer frame 40 and in a first direction D1 towards and beneath the frame rail 14.

A controller 100 is also provided and supported by the chassis 12. The controller 100 may be part of a vehicle control system with one or more controllers or control modules for the various vehicle components and systems. The control system for the vehicle may include any number of controllers, and may be integrated into a single controller, or have various modules. Some or all of the controllers may be connected by a controller area network (CAN) or other system. It is recognized that any controller, circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

The controller 100 is in communication with the sensor 98 and the locking element 86. The controller 100 opens or releases the locking element 86 such that the hinge 84 may rotate freely, and such that the outer frame 90 and the bracket 50 rotate relative to the first frame rail 14 via the hinge 84 in response to receiving a signal from the sensor 98 indicative of the external force F exceeding a threshold value. The controller 100 may process a signal from the sensor 98 that measures acceleration in one or more axes to determine the external force F, or may use an acceleration in comparison to a threshold value to control the state of the locking element 86.

In another example, the hinge 84 is provided with an actively controlled locking element 86 with a sensor 98 and controller 100, and also includes passive locking element 86 features that plastically deform or fracture in response to the external load or force F. As such, energy may be absorbed or dissipated due to the plastic deformation or fracture.

In the second position, the outer frame 90 further provides a surrounding structure for the tank 36, and acts as a further barrier between the object applying the external force and the tank 36.

FIG. 6 illustrates a mounting assembly 38 for a compressed gas fuel tank 36 according to yet another embodiment, and in a normal use position. The mounting assembly 38 of FIG. 6 is intended for use without a secondary rail 40 or other frame surrounding the tank 36 and positioned outboard of the tank 36. Elements in FIG. 6 that are the same as or similar to those described above with respect to FIGS. 2-5 are given the same reference number and reference may be made to the detailed description above.

The mounting assembly 38 has a dive plate 74 connected to the chassis, e.g. to the longitudinal frame rail. The dive plate 74 is positioned to guide movement of the tank 36 in the first direction D1. The outer face 110 of the dive plate 74 may be planar or another complex shape. The outer face 110 of the dive plate 74 may be parallel to the first direction D1 such that the bracket 50 and/or tank 36 slide or translate along the outer face of the dive plate 74. The outer face 110 of the dive plate 74 faces away from the first frame rail 14.

The dive plate 74 defines a track 112 that extends in the first direction D1. The bracket 50 of the mounting assembly 38 has a first end region 52 that is slidably engaged with the track 112 of the dive plate, and a concave region 56 that is sized to receive the tank 36. The dive plate 74 therefore connects the bracket 50 to the first frame rail 14.

A locking element 86 may be provided that releasably connects the bracket 50 to the dive plate 74. The locking element 86 prevents the bracket 50 from moving relative to the dive plate 74. In one example, the locking element 86 is a shear pin, fastener, or welded plate that fractures in response to an external load F on the tank 36 being above a threshold value. In another example, the locking element 86 may be controlled using a sensor 98 and a controller 100 as described above to release the bracket 50 relative to the dive plate 74. When released, the bracket 50 and tank 36 move along the dive plate 74 in the first direction D1 towards and beneath the first frame rail 14. In one example, the bracket 50 maintains its connection to the dive plate 74 after the locking element 86 has been released. In other examples, the bracket 50 may separate from the dive plate 74 as the tank 36 moves from the first position to the second position. The dive plate 74 may additionally contact the bracket 50 and/or the tank 36 to guide movement of the tank 36 in the first direction D1 and along an outer face 110 of the dive plate 74, and prevent the tank 36 from contacting the first frame rail 14 or another chassis component.

FIG. 7 illustrates a mounting assembly 38 for a compressed gas fuel tank 36 according to another embodiment, and in a normal use position. The mounting assembly 38 may be used with the vehicle of FIG. 1, and further may be used without a secondary rail 40 or other frame surrounding the tank 36 and positioned outboard of the tank 36. Elements in FIG. 7 that are the same as or similar to those described above with respect to FIGS. 2-6 are given the same reference number and reference may be made to the detailed description above.

The mounting assembly 38 has at least one bracket 50. According to the example shown, the bracket 50 may be provided by a J-shaped bracket. The mounting assembly 38 may include a plurality of brackets, or only a single bracket. The bracket 50 has a first end region 52 and a concave region 56 sized to receive the compressed gas fuel tank 36.

The mounting assembly 38 and bracket 50 move the compressed gas tank 36 from first position as shown in FIG. 7, away from an external force F applied to an outer surface of the tank 36 and in a first direction D1 towards and/or beneath the first frame rail 14. The mounting assembly 38 may additionally be provided with a stop limit 72 or dive plate 74 as described above.

The mounting assembly 38 has a first mounting tube 120 and a second mounting tube 122. The first and second mounting tubes 120, 122 may be provided as nested, stepped, concentric tubes according to one example and as shown. The first end region 52 of the bracket is connected to the first mounting tube 120. The second mounting tube 122 is connected to the first frame rail 14.

One of the first and second mounting tubes 120, 122 is slidably received within the other of the first and second mounting tubes 120, 122. In the example shown, the first mounting tube 120 is slidably received or nested within the second mounting tube 122.

The first and second mounting tubes 120, 122 may be connected via a locking element 86, such as a shear pin, fastener, or welded plate that fractures in response to the external force on the tank 36 such that the first mounting tube 120 slides relative to the second mounting tube 122, and the tank 36 moves in the first direction D1.

In a further example, the inner diameter of the second mounting tube 122 may taper in an inboard direction or in the first direction D1. Alternatively, or additionally, the outer diameter of the first mounting tube 120 may increase in an inboard direction or in the first direction D1. As such, the first and second mounting tubes 120, 122 may have an interference fit that further dissipates energy as the external force is applied and the tank 36 moves from the first position towards the second position.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle comprising:
   a chassis with a first frame rail and a second frame rail, each frame rail extending longitudinally; and
   a mounting assembly having a bracket with a concave region to receive and attach to a compressed gas tank to move the compressed gas tank away from an external force applied to an outer surface of the tank and in a first direction towards and beneath the first frame rail, the bracket having a first end region connected to the first frame rail to position the tank on an outboard side of the first frame rail.

2. The vehicle of claim 1 wherein the bracket defines a stress riser positioned between the concave region and the first end region to plastically deform without fracturing in response to the external force on the tank.

3. The vehicle of claim 2 wherein a corrugated shape defined by the bracket forms the stress riser.

4. The vehicle of claim 2 further comprising a stop limit connected to the first frame rail, the stop limit positioned to limit movement of the tank in the first direction.

5. The vehicle of claim 2 further comprising a dive plate connected to the first frame rail, the dive plate positioned to guide movement of the tank in the first direction and along an outer face of the dive plate.

6. The vehicle of claim 1 wherein the first end region of the bracket is connected to the first frame rail via a hinge and a locking element, the locking element to fracture in response to the external force on the tank such that the bracket rotates relative to the first frame rail via the hinge.

7. The vehicle of claim 1 wherein the first end region of the bracket has a first mounting tube connected thereto, and the first frame rail has a second mounting tube connected thereto, one of the first and second mounting tubes slidably received within the other of the first and second mounting tubes; and
   wherein the first and second mounting tubes are connected via a locking element to fracture in response to the external force on the tank such that the first mounting tube slides relative to the second mounting tube.

8. The vehicle of claim 1 wherein the vehicle is without a frame positioned outboard of the compressed gas tank.

9. The vehicle of claim 1 comprising a secondary rail having a first end and a second end, the first and second ends each connected to the first frame rail, the secondary rail extending outwardly from the first frame rail on the outboard side thereof and surrounding the compressed gas tank.

10. The vehicle of claim 9 wherein the first end region of the bracket is connected to the first frame rail via a hinge; and
wherein the bracket has a second end region opposite to the first end region, the concave region positioned between the first and second end regions, the second end region of the bracket connected to the secondary rail via a locking element, the locking element to fracture in response to the external force on the tank such that the bracket rotates relative to the first frame rail via the hinge.

11. The vehicle of claim 1 wherein the mounting assembly further comprises an outer frame connected to the bracket, the outer frame defining a recessed area to receive the tank and the concave region of the bracket; and
wherein the outer frame is rotatably connected to the first frame rail via a hinge and a locking element such that the recessed area is positioned between the outer frame and the first frame rail.

12. The vehicle of claim 11 wherein the outer frame and the bracket rotate relative to the first frame rail via the hinge in response to fracturing of the locking element.

13. The vehicle of claim 11 further comprising:
a sensor connected to the tank; and
a controller in communication with the sensor and the locking element, the controller opening the locking element in response to receiving a signal from the sensor indicative of the external force exceeding a threshold value to allow the outer frame and the bracket to rotate relative to the first frame rail via the hinge.

14. The vehicle of claim 1 wherein the mounting assembly further comprises a dive plate connected to the first frame rail, the dive plate having an outer face extending in a plane parallel to the first direction and facing away from the first frame rail, the outer face defining a track;
wherein the first end region of the bracket is slidably engaged with the track such that the dive plate connects the bracket to the first frame rail; and
wherein the mounting assembly further comprises a locking element releasably connecting the bracket to the dive plate.

15. The vehicle of claim 1 further comprising a compressed gas tank having a circular outer perimeter;
wherein the concave region of the bracket extends about a portion of the circular outer perimeter.

16. The vehicle of claim 15 further comprising a fuel line connected to the compressed gas tank via a normally closed solenoid valve, the fuel line fluidly connecting the compressed gas tank to a prime mover of the vehicle.

17. The vehicle of claim 15 further comprising at least one strap extending about the compressed gas tank and the bracket to maintain the compressed gas tank within the concave region of the bracket.

18. A mounting assembly for a compressed gas fuel tank, the mounting assembly comprising:
an outer frame supporting the compressed gas fuel tank, the outer frame defining a recessed area to receive at least a portion of the compressed gas fuel tank therein;
a hinge connected to the outer frame to rotatably connect the outer frame to a longitudinal frame rail of a vehicle chassis and support the compressed gas fuel tank on an outboard side thereof such that the recessed area is positioned between the outer frame and the frame rail; and
a locking element connected to the outer frame, the locking element maintaining a position of the outer frame relative to the hinge in a first state, and releasing the hinge in a second state such that the outer frame and tank rotate away from an external force applied to an outer surface of the tank and in a first direction towards and beneath the frame rail.

19. A mounting assembly for a compressed gas fuel tank, the mounting assembly comprising:
a bracket extending from a first end region to a second end region, the first end region to connect to a longitudinal frame rail of a vehicle chassis to support the compressed gas fuel tank on an outboard side thereof, the bracket defining a concave region positioned between the first and second end regions, the concave region sized to receive the compressed gas fuel tank and extend about at least a portion of an outer perimeter of the tank;
wherein the mounting assembly plastically deforms without fracture to move the compressed gas fuel tank away from an external force applied to an outer surface of the tank and in a first direction towards and beneath the frame rail.

20. The mounting assembly of claim 19, wherein the bracket further comprises a corrugation positioned between the first end region and the concave region, the corrugation formed by first and second side walls that are angled relative to the first end region and an end wall connecting the side walls, wherein the end wall connects the first end region to the concave region via the first and second side walls, and wherein the corrugation provides a stress riser for the mounting assembly that plastically deforms without fracturing in response to the external force on the tank.

* * * * *